Patented Apr. 4, 1939

2,153,064

UNITED STATES PATENT OFFICE 2,153,064

PROCESS FOR THE PREPARATION OF GLYCOLIC ACID

Alfred T. Larson, Wilmington, Del., assignor to E. I. du Pont de Nemours & Company, Wilmington, Del., a corporation of Delaware No Drawing. Application November 3, 1937, Serial No. 172,513

19 Claims. (Cl. 260—530)

This invention relates to an improved process for the preparation of glycolic acid and is more especially related to the preparation of glycolic acid by the interaction of formaldehyde with carbon monoxide in the presence of an organic acid.

Glycolic acid, otherwise known as hydroxy-acetic acid, ethanolic acid, and having the formula $CH_2OHCOOH$, has been usually prepared heretofore by treating monochlor acetic acid with caustic potash. In an attempt to develop more economical processes for its preparation various other methods have been proposed as, for example, the oxidation of ethylene glycol to glycolic aldehyde, followed by the subsequent oxidation of glycolic aldehyde to glycolic acid, and via the preparation of formaldehyde cyanhydrin followed by hydration. Due in large measure to the high cost of the basic materials required for the manufacture of this acid by these and other known processes, the acid has been expensive, and consequently has been limited in many of the important uses for which it is adapted.

An object of the present invention is to provide an improved, highly efficient process for the preparation of glycolic acid. Another object of the invention is to provide a process for the preparation of glycolic acid from formaldehyde, an organic acid, water and carbon monoxide, which is conducted at a high rate and with excellent utilization of the formaldehyde. Another and more specific object of the invention is to provide a process wherein formaldehyde and water are dissolved in an organic acid and more especially glycolic acid and in the presence of an acidic type catalyst reacted with carbon monoxide. Other objects and advantages of the invention will hereinafter appear.

The above and other objects of the invention are realized by dissolving formaldehyde, or one of its polymers, and water in an organic acid, and in the presence of a catalyst having acidic characteristics, subjecting the resulting solution to heat and pressure and an atmosphere of carbon monoxide, whereupon glycolic acid is obtained in accordance with the equation:

$$HCHO + CO + HOH \rightarrow CH_2OHCOOH$$

This reaction may be carried out by placing the mixture of aldehyde, water, organic acid and catalyst in an autoclave, applying the necessary pressure by forcing in carbon monoxide and effecting the reaction by the application of heat.

The formaldehyde may be subjected to the reaction in any convenient way or in any convenient form. Thus, formaldehyde may be dissolved in water to give an aqueous solution thereof containing up to approximately 62% formaldehyde (for instance, technical "formalin"), or solutions of polymeric formaldehyde, e. g., para-formaldehyde or trioxymethylene, may be dissolved in the organic acid. Such solutions may be employed for reaction with carbon monoxide after, if desired, dissolving therein a suitable quantity of catalyst. I have found that the mixture obtained by scrubbing with an organic acid the hot gaseous products from the vapor phase oxidation of methanol to formaldehyde and water will react with carbon monoxide by my process to give substantially quantitative yields of glycolic acid.

Acidic catalysts generally are recommended for this synthesis. A number of the catalysts which are suitable, all of which catalysts are of an acidic nature, include, for example, the inorganic acids and more particularly hydrochloric acid, sulfuric acid and phosphoric acids; inorganic acidic salts, such, for example, as potassium acid sulfate, sodium acid phosphate, boron fluoride; and generally the acidic catalysts which have been designated as particularly useful for the acid synthesis reactions involving the interaction of methanol and ethanol with carbon monoxide. These catalysts may be used in amounts ranging from 0.01 to 0.5 mol thereof per mol of formaldehyde.

For the preparation of glycolic acid it is preferable to have a quantity of water present equal to at least 0.06 mol of water per mol of the formaldehyde present. While concentrations of water higher than 1.0 mol per mol of formaldehyde may be present the higher concentrations, say, 15 to 20 mols per mol of formaldehyde, are not used advisedly for they tend to lower the concentration of the product with resultant greater difficulty in subsequent concentration thereof. To partially or completely replace water, compounds which decompose under conditions of the reaction to form water may be present, especially aliphatic monohydric alcohols, e. g., methanol, ethanol, propanol, and the like.

The quantity of organic acid used is not particularly critical although an amount ranging from 0.5 mol to 5.0 mols per mol of formaldehyde has been found to give excellent results. While I have referred to the organic acid added as a solvent, it undoubtedly has a more important function to perform than the word solvent connotes. What that function is, is not clearly understood. I have determined, however, that with organic acid present high conversions of the aldehyde to glycolic acid can be consistently obtained, while without it conversions are erratic.

Organic acids which may be employed for this purpose include the monocarboxylic acids, such, for example, as, acetic acid, propionic acid, normal and isobutyric acids, trimethyl acetic acid, and the higher straight and branch-chain acids; the polycarboxylic acids such as succinic acid and the like; hydroxy carboxylic acids may likewise be used such as glycolic acid, lactic acid and ricinoleic acid and the aromatic acids such as benzoic and toluic acids; esters of these and equivalent organic acids may likewise be used. Surprising as it may seem glycolic acid itself is an exceptionally effective solvent as it minimizes recovery problems and gives excellent operating advantages. With solid acids and particularly those which are not liquids at the temperature of the reaction, a mutual solvent may be used, i. e., a liquid which dissolve the solid acid and the formaldehyde.

The carbon monoxide required for the synthesis may conveniently be derived from various commercial sources, as, for example, from water gas, producer gas, etc., by liquefaction or other methods and should, for best results, be relatively pure. The carbon monoxide should preferably be present in sufficient excess to insure an adequate supply thereof for absorption by the formaldehyde in order to inhibit any appreciable decomposition of the formaldehyde to carbon monoxide and hydrogen or other products.

The reaction proceeds at ordinary pressures although it is advantageous to use pressures in excess of atmospheric, say, from 5 to 1500 atmospheres or more. The reaction which is exothermic, may be effected over a wide range of temperatures although the optimum temperature varies with specific conditions depending, inter alia, upon the relative concentrations of catalysts, organic acid, water, formaldehyde and carbon monoxide. The reaction can be carried out at temperatures ranging from 50° C. to 350° C., although temperatures ranging between 140 and 225° C. have been found preferable. Mild cooling means should generally be provided to maintain the temperature within the selected range.

By subjecting the reactants to temperature and pressures within the designated ranges the normally liquid reactants are maintained in the liquid phase and apparently the carbon monoxide is forced into the liquid and reacts therein with the formaldehyde and water present. While the invention is not limited to any theory or explanation of the operation of the process the foregoing appears satisfactorily to explain its mechanism and accordingly in certain of the claims the process is designated as being conducted in the liquid phase for the reaction appears to take place primarily, if not entirely, in that phase.

The reaction product consists essentially of a solution containing glycolic acid, the solvent (if an organic acid other than glycolic was used), a small amount of formic acid, unconverted formaldehyde, the catalyst, and a considerable portion of water. The glycolic acid may be separated from this crude mixture by distillation which is preferably carried out at from 80 to 100 mm. mercury pressure. After distillation of the greater portion of the free water, solvent, formic acid, alcohol, and unchanged formaldehyde, the residue may be neutralized, e. g., with calcium carbonate, to convert the glycolic acid into a readily separable salt, or the residue may be esterified with a suitable alcohol for removal of the glycolic acid as an ester. If desired, glycolic acid may be recovered from the concentrated solution by crystallization, after separation of the catalyst and removal of excess water under reduced pressures.

The following examples will illustrate methods of practicing the invention although it will be understood that the invention is not limited to the details therein given. The percentage yields given are calculated on the formaldehyde used.

*Example 1*

There was placed in a high pressure autoclave an aqueous solution containing 1 mol of formaldehyde, and 1 mol of water dissolved in 2 mols of acetic acid. 0.10 mol of hydrochloric acid was added as the catalyst. A carbon monoxide atmosphere was superimposed above the liquid and the pressure increased to between 800 and 900 atmospheres. The autoclave and contents were heated to a temperature between 160° C. and 170° C. for a period of approximately 60 minutes, with continuous agitation. The pressure was released and the contents of the autoclave, upon analysis, gave a 98% yield of glycolic acid.

*Example 2*

The process of Example 1 was carried out using similar equipment and a mixture containing 1 mol of formaldehyde, 0.5 mol of water, 2 mols of acetic acid and 0.05 mol of sulfuric acid. At a temperature ranging between 129 and 170° C. and a CO pressure of 900 atmospheres, a 93% yield of glycolic acid was obtained in 60 minutes.

*Example 3*

The process of Example 1 was repeated using a mixture containing 1 mol of formaldehyde, 1 mol of water, 2 mols of acetic acid and 0.02 mol of sulfuric acid. At a temperature between 160 and 183° C. and at a CO pressure between 800 and 900 atmospheres, a 96% yield of glycolic acid was obtained in 30 minutes.

*Example 4*

The process of Example 1 was repeated using a mixture containing 1 mol of formaldehyde, 0.5 mol of water, 2 mols of acetic acid and 0.02 mol of sulfuric acid. The reaction was continued for 60 minutes at a temperature between 146 and 170° C. and a CO pressure between 800 and 900 atmospheres. A 93% yield of glycolic acid was obtained.

*Example 5*

The process of Example 1 was repeated using a mixture containing 1 mol of formaldehyde, 2 mols of water, 2 mols of glycolic acid and 0.03 mol of sulfuric acid. At a temperature of approximately 200° C. and a CO pressure of approximately 700 atmospheres, a 90% yield of glycolic acid was obtained in 5 minutes.

*Example 6*

Glycolic acid has been prepared by a continuous process wherein a solvent mixture, containing on a molal basis, 2 parts of glycolic acid, 1 part of water and approximately 0.02 part of sulfuric acid is used to absorb, in a gas scrubber, 1 part of formaldehyde and 1 part of water. The resulting solution now containing glycolic acid, formaldehyde, water and catalyst in the ratio of approximately 2:1:2:0.02 is passed through a conversion chamber which is filled with glass beads wherein it contacts carbon monoxide, the reactants being maintained in this chamber at a temperature of approximately 200° C. and a pressure of approximately 700 atmospheres. The formaldehyde is substantially quantitatively converted to give a product discharged from the converter having substantially the composition, 3 parts of glycolic acid, 1 part of water and 0.02 part of sulfuric acid. One part of glycolic acid is removed by crystallization or distillation and the residue containing glycolic acid, water, and sulfuric acid in the ratio of 2:1:0.02 returned to the scrubber to absorb more formaldehyde and water.

Although Examples 1 to 4 inclusive indicate that reaction was continued for from 30 to 60 minutes, it has been found that the reaction time is considerably less as indicated in Example 5, wherein a time of contact of but 5 minutes is sufficient to give exceptionally good yields of glycolic acid. The use of an organic acid as the solvent appears to have this highly desirable effect of increasing the rate of reaction and making it possible to increase surprisingly the through-put of a given apparatus as compared with a reaction of the same type wherein an organic acid is not used as the solvent.

The invention, as shown in Example 1, may be effected in a continuous manner by passing the aldehyde, acid, water and catalyst through a reaction zone either co-current or counter-current to the flow of carbon monoxide, the rates of flow being adjusted to yield the desired degree of reaction. The carbon monoxide should be maintained, as in the processes described in the examples, at a suitable pressure and the temperature of the continuous reaction should be held within the prescribed range by suitable heating means.

In order to insure adequate intimate contact between the reactants, thorough stirring is an essential to high yields when conducting the process in an autoclave and no matter what the type of reaction vessel used intimate contact is of considerable importance if optimum results are desired.

Because of the corrosive nature of the catalyst and reactants it is advisable to carry out the process of the present invention in glass, silica, porcelain-lined or glass-lined vessels, or the inner surfaces of the reaction vessel which contact with the reactants should be constructed of such corrosion-resistant metals as silver, chromium, stainless steel, and the like.

When formaldehyde is referred to in the appended claims it will be understood that paraformaldehyde, formalin, or trioxymethylene or other polymeric or monomeric form of formaldehyde, as well as formaldehyde, are also included.

From a consideration of the above specification it will be appreciated that many details therein given may be changed without departing from the scope of the invention or sacrificing any of the advantages that may be derived therefrom.

I claim:

1. An improved process for the preparation of glycolic acid which comprises reacting formaldehyde, water and carbon monoxide catalyzed by an inorganic acidic catalyst while dissolved in at least one-half a mol of an organic acid per mol of formaldehyde.

2. The process of claim 1 conducted at a pressure of at least 5 atmospheres.

3. The process of claim 1 conducted at a temperature between 50 and 350° C.

4. In an improved process for the preparation of glycolic acid from carbon monoxide, water and formaldehyde at a temperature between 50° C. and 350° C., at a pressure of at least 5 atmospheres, and catalyzed by an inorganic acidic catalyst, the step which comprises carrying out the reaction in an organic acid.

5. The process of claim 4 conducted in at least 0.5 mol of an organic acid per mol of formaldehyde.

6. The process of claim 4 conducted in acetic acid.

7. The process of claim 4 conducted in glycolic acid.

8. The process of claim 4 conducted in at least 0.5 mol of glycolic acid per mol of formaldehyde.

9. The process of claim 4 conducted in from 0.5 mol to 5.0 mol of glycolic acid per mol of formaldehyde.

10. The improved process for the preparation of glycolic acid which comprises scrubbing products from the vapor phase oxidation of methanol to formaldehyde and water with an organic acid and subsequently, at a temperature between 50° C. and 350° C. and a pressure above 5 atmospheres, contacting the acid and its absorbed vapors with carbon monoxide.

11. The process of claim 10 in which the organic acid is acetic acid.

12. The process of claim 10 in which the organic acid is glycolic acid.

13. The process of claim 10 in which the organic acid is trimethyl acetic acid.

14. The process of claim 10 in which a mol of the organic acid absorbs from 0.2 mol to 2 mols of formaldehyde prior to its reaction with carbon monoxide.

15. The process of claim 10 in which the organic acid is glycolic acid and it absorbs from 0.2 mol to 2 mols of formaldehyde prior to its reaction with carbon monoxide in the presence of an inorganic acidic catalyst.

16. The improved process for the preparation of glycolic acid which comprises absorbing approximately one mol of water vapor and approximately one mol of formaldehyde in approximately two mols of glycolic acid, adding approximately 0.03 mol of sulfuric acid, and contacting the resulting mixture with carbon monoxide at a temperature of approximately 200° C. and a pressure of approximately 700 atmospheres.

17. A cyclic process for the preparation of glycolic acid which comprises passing a mixture containing an organic acid solvent and water through an absorption chamber wherein the mixture absorbs formaldehyde and water, passing the resulting mixture into a conversion chamber wherein glycolic acid is formed by the reaction of formaldehyde with carbon monoxide, discharging the organic acid solvent, glycolic acid and water from the conversion chamber, separating therefrom the glycolic acid and returning the organic acid solvent and water to the absorption chamber.

18. A cyclic process for the preparation of glycolic acid which comprises passing a mixture of glycolic acid and water through an absorption chamber wherein the mixture absorbs formaldehyde and water, passing the resulting mixture into a conversion chamber wherein glycolic acid is formed by the reaction of formaldehyde with carbon monoxide, discharging glycolic acid and water from the conversion chamber, separating therefrom a portion of the glycolic acid and returning the remainder to the absorption chamber.

19. A cyclic process for the preparation of glycolic acid which comprises passing a mixture containing on a molal basis glycolic acid, water and sulfuric acid in the approximate ratio of 2:1:0.02 through an absorption chamber wherein the mixture absorbs 1 part of formaldehyde and 1 part of water to give a product leaving the absorption chamber containing glycolic acid, formaldehyde, water and sulfuric acid in the approximate ratio of 2:1:2:0.02, passing the mixture into a conversion chamber wherein substantially all the formaldehyde reacts with carbon monoxide to give a product leaving the converter having an approximate composition of glycolic acid, water and acid of 3:1:0.02, separating from this mixture substantially 1 mol of glycolic acid and continuously returning the remaining glycolic acid, water and sulfuric acid to the absorber.

ALFRED T. LARSON.

CERTIFICATE OF CORRECTION.

Patent No. 2,153,064.              April 4, 1939.

ALFRED T. LARSON.

It is hereby certified that error appears in the printed specification of the above numbered patent requiring correction as follows: Page 1, second column, line 34, for "0.06" read 0.05; and that the said Letters Patent should be read with this correction therein that the same may conform to the record of the case in the Patent Office.

Signed and sealed this 6th day of June, A. D. 1939.

(Seal)                          Henry Van Arsdale
                               Acting Commissioner of Patents.

19. A cyclic process for the preparation of glycolic acid which comprises passing a mixture containing on a molal basis glycolic acid, water and sulfuric acid in the approximate ratio of 2:1:0.02 through an absorption chamber wherein the mixture absorbs 1 part of formaldehyde and 1 part of water to give a product leaving the absorption chamber containing glycolic acid, formaldehyde, water and sulfuric acid in the approximate ratio of 2:1:2:0.02, passing the mixture into a conversion chamber wherein substantially all the formaldehyde reacts with carbon monoxide to give a product leaving the converter having an approximate composition of glycolic acid, water and acid of 3:1:0.02, separating from this mixture substantially 1 mol of glycolic acid and continuously returning the remaining glycolic acid, water and sulfuric acid to the absorber.

ALFRED T. LARSON.

CERTIFICATE OF CORRECTION.

Patent No. 2,153,064.   April 4, 1939.

ALFRED T. LARSON.

It is hereby certified that error appears in the printed specification of the above numbered patent requiring correction as follows: Page 1, second column, line 34, for "0.06" read 0.05; and that the said Letters Patent should be read with this correction therein that the same may conform to the record of the case in the Patent Office.

Signed and sealed this 6th day of June, A. D. 1939.

(Seal)

Henry Van Arsdale
Acting Commissioner of Patents.